United States Patent
Arool Emmanuel et al.

(10) Patent No.: US 11,841,455 B1
(45) Date of Patent: Dec. 12, 2023

(54) CALIBRATING RADAR SYSTEMS FOR MOVEMENT DETECTION

(71) Applicant: Amazon Technologies, Inc., Seattle, WA (US)

(72) Inventors: Cyril Arokiaraj Arool Emmanuel, San Jose, CA (US); Seyed Yahya Mortazavi, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 272 days.

(21) Appl. No.: 17/150,227

(22) Filed: Jan. 15, 2021

(51) Int. Cl.
  *G01S 7/03* (2006.01)
  *G01S 7/40* (2006.01)
(52) U.S. Cl.
  CPC .............. *G01S 7/038* (2013.01); *G01S 7/40* (2013.01); *G01S 7/4021* (2013.01)
(58) Field of Classification Search
  None
  See application file for complete search history.

(56) References Cited

U.S. PATENT DOCUMENTS 11,221,404 B1 * 1/2022 DeSalvo .............. G06F 3/011
2019/0353750 A1 * 11/2019 Rimini ................ H01Q 21/28

* cited by examiner

*Primary Examiner* — Whitney Moore
(74) *Attorney, Agent, or Firm* — Lee & Hayes, P.C.

(57) ABSTRACT

Techniques for calibrating radar systems to remove undesirable effects of mutual coupling where radar receivers absorb energy emitted from nearby transmitters (e.g., leakage). Electronic devices may have radar systems that have multiple transmit antennas and multiple receive antennas, or Multiple-Input Multiple-Output (MIMO) radar systems. Electronic devices with MIMO radar systems may have closely spaced transmitter and receiver arrays with poor radio frequency (RF) isolation. Poor RF isolation may lead non-linearities in the receiver chain, which in turn leads to an increase in receiver noise floor that degrades the radar performance. The calibration process(es) described herein include identifying the receiver noise floor for the environment of the electronic device. The transmitter and/or receiver gain may then be fine-tuned to account for the noise floor such that the effects of poor RF isolation are substantially removed from the representations of objects in the environment created using the radar systems.

18 Claims, 9 Drawing Sheets

CALIBRATING RADAR SYSTEMS FOR MOVEMENT DETECTION

BACKGROUND

As capabilities of electronic devices continue to increase, the use of electronic devices continues to proliferate into different areas of life. For instance, electronic devices have been developed that have movement-detection capabilities and include different types of detection systems to detect objects and/or movement, such as Light Detection and Ranging (LIDAR) systems, Radio Detection and Ranging (RADAR) systems, and so forth. Electronic devices that include radar systems are able to use the radar systems to detect objects in an environment by transmitting electromagnetic waves that incident on objects in their path then reflect. By capturing the reflected waves, the radar systems are able to determine the range, velocity and angle of the objects as they move through the environments of the electronic devices. Due to the usefulness of radar for presence detection, many different industries have begun to utilize radar systems, such as autonomous-vehicle industries, health and wellness industries, security industries, and so forth. As radar systems continue to be used in these new industries and for different purposes, the complexity of the radar systems similarly continues to increase. Described herein are technical improvements to technical problems experienced by radar systems in various industries and technology areas.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
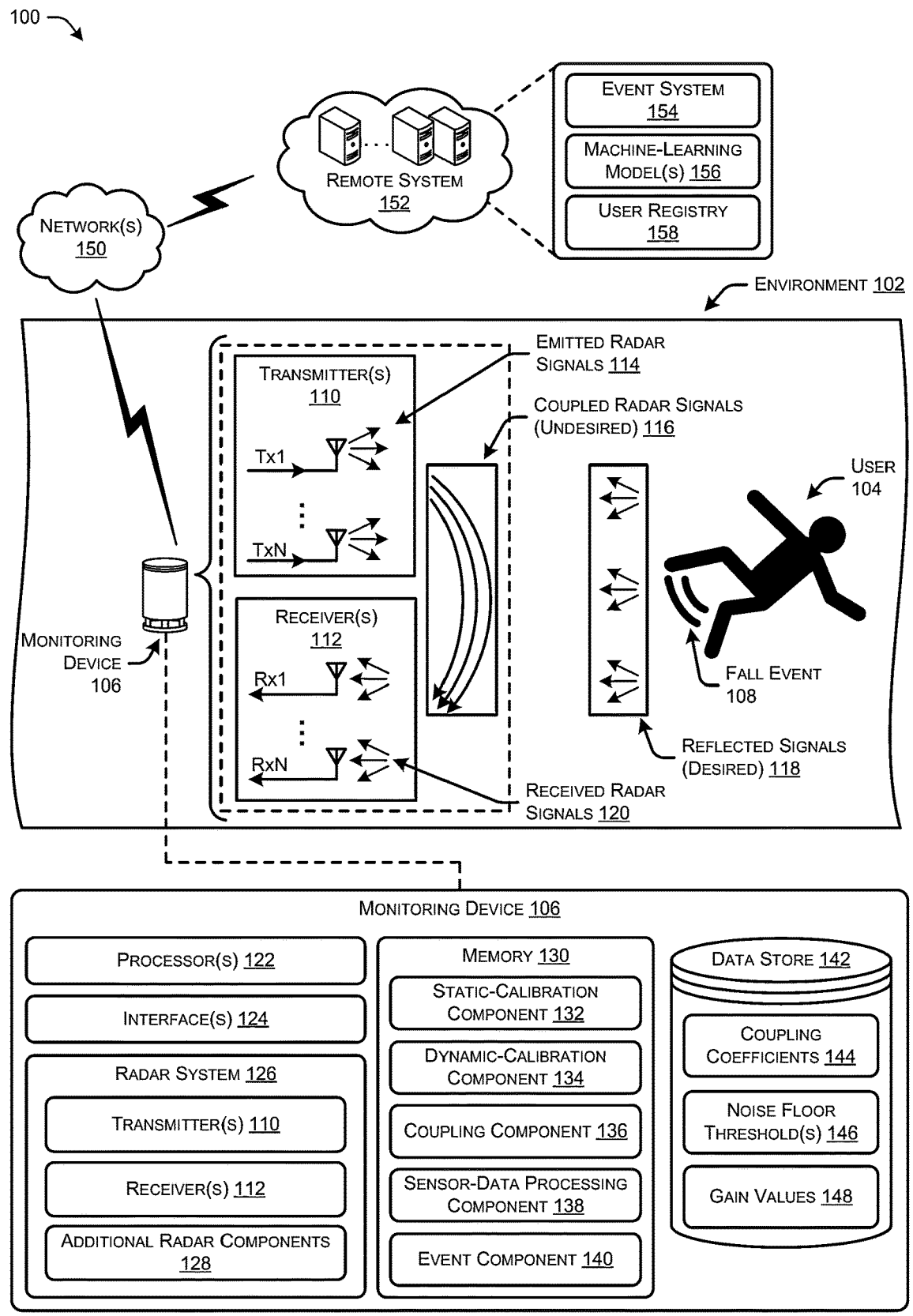
FIG. 1 illustrates a schematic diagram of an example environment where a monitoring device calibrates a radar system to account for mutual coupling, and detects movement in an environment using the radar system.

This disclosure describes techniques for calibration processes for radar systems to remove undesirable effects of mutual coupling where radar receivers absorb energy being emitted from nearby transmitters (e.g., leakage). In some examples, electronic devices may have radar systems that have multiple transmit antennas and multiple receive antennas, or Multiple-Input Multiple-Output (MIMO) radar systems. In such systems, the transmitter arrays may transmit electromagnetic waves into an environment or area to be monitored, and the electromagnetic waves may then reflect off objects in the environment that lie in the paths of the transmitted waves. The receiver arrays then capture the reflected signal, and the radar system can then determine the range, velocity, and angle of the objects in the environment. Electronic devices that have MIMO radar systems may be able to create images, or representations, of multiple objects (or "targets") within the range or coverage of the radar system. To achieve accurate detection and resolution of objects in the environment, the electronic devices may require specific physical antenna array configurations and beamforming techniques. However, these requirements may result in closely spaced transmitter arrays and receiver arrays that result in poor radio frequency (RF) isolation. Further, poor RF isolation may lead to non-linearities in the receiver chain, which in turn leads to an increase in receiver noise floor (e.g., sum of unwanted signals) that degrades the radar range performance, resulting in objects not being accurately detected by the radar system at various ranges.

The calibration process(es) described herein include identifying mutual coupling coefficients for the transmitters and receivers in the transmitter and receiver arrays, and also the receiver noise floor for the environment of the electronic device. The coupling coefficients may be used such that transmitter gain and/or receiver gain for the arrays may then be fine-tuned to account for the receiver noise floor such that the effects of poor RF isolation, and/or other unwanted signals, are substantially removed from the sensor data that represents objects in the environment. In this way, electronic devices with MIMO radar systems that have poor RF isolation may maintain accurate detection and resolution of objects at different range conditions in the environment of the electronic devices.

The electronic devices described herein may include a radar system that includes at least a radar transmitter array and a radar receiver array. The radar transmitter array may be configured to produce and emit electromagnetic waves in the radio or microwave domain. One or more transmitting antennas of the electronic device may transmit the electromagnetic waves from the antenna(s) and into the environment in question. The electromagnetic waves (also described herein as "transmitted energy") may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device may include the radar receiver array, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). The electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

Accordingly, electronic devices having radar systems (and associated analog, digital, and/or RF components) can be configured to use the radar systems to identify objects in an environment, determine if the objects are moving, and determine a velocity at which the objects are moving. The ability of the electronic devices to identify and objects and determine if they are moving relies on the fact that the radar system has sufficient RF isolation such that there is little or no leakage power between transmitters and receivers. However, as noted above, in some MIMO radar systems, the transmitters and receivers may be placed in certain physical configurations, such as configurations designed for beamforming, such that transmitter and receiver pairs experience poor RF isolation. Stated otherwise, transmitters and receivers may be positioned too close to each other such that the receivers absorb energy (e.g., electromagnetic waves) emitted from transmitters prior to that energy being able to reflect off objects in the environment and return to the receivers. In such examples, the leakage may cause non-linearities in the receive chain which leads to an increase in receiver noise floor. As described herein, receiver noise floor is the measure of the signal created in the environment from the sum of all noise sources and unwanted signals within a measurement system, where "noise" is defined as any signal other than the one being monitored (e.g., any signal other than reflected signals).

As noted above, the techniques described herein may include a static-calibration process where the monitoring device determines coupling coefficients that represent a measure of mutual coupling between transmitter and receiver pairs in a static environment. For instance, upon entering a static-calibration mode, such as when the monitoring device powers up and/or at another preconfigured time, the monitoring device may begin causing one or more transmitters to begin emitting radar signals, and the receivers may receive the transmitted radar signals. As noted above, the transmitters and receivers of the monitoring device may be located in close proximity such that the receivers absorb portions of the transmitted radar signals prior to them reflecting off objects due to mutual coupling. In the static-calibration mode, there may be little or no movement in the environment of the monitoring device. In such examples, the received radar signals may be dominated by the coupled signals received due to mutual coupling. Accordingly, the monitoring device may analyze the received radar signals with respect to the transmitted radar signals to determine a measure of the mutual coupling. For instance, because the transmit power/energy is known, and the energy in the received radar signals will be dominated by coupled signals, the monitoring device may determine coupling coefficients that indicate measurements of mutual coupling between transmitters and receivers, such as by simply dividing the transmit energy/power of the transmitted radar signals by the receive energy/power of the received radar signals. In some instances, the monitoring device may iteratively cause each of the transmitters to emit radar signals individually such that coupling coefficients can be determined for each transmitter with respect to each receiver in the array.

Additionally, the monitoring device may calculate a receiver noise floor for the radar receivers in the receiver array. Generally, the receiver noise floor of the radar receivers is the measure of the signal created from the sum of all the noise sources, or unwanted signals, that are detected by the radar receivers. The receiver noise floor includes the coupled signals received by the radar receivers caused by mutual coupling, as well as any noise from other unwanted sources in the environment of the monitoring device. The receiver noise floor may generally indicate the level of background/unwanted noise that is present before desirable/wanted signals are received or detectable. The higher the receiver noise floor, the more energy/power that desirable signals must be received at by radar receivers to be detected over the receiver noise floor.

After determining the receiver noise floor and the coupling coefficients for the transmitters and receivers, the monitoring device may use the coupling coefficients to adjust the gains for the transmitters and/or receivers to help ensure that wanted or desirable signals are detectable over the receiver noise floor (e.g., greater than the measure of coupled signals). The transmit paths and/or receive paths may be tuned to adjust the gains in the paths to help ensure that the reflected radar signals received by the radar receivers are received at a higher energy level than the receiver noise floor. In some instances, tuning the transmit paths and/or receiver paths may include modifying or adjusting components of the transmit or receive paths to change the gain, such as adjusting a mixer (e.g., up-conversion mixer), a programmable gain amplifier (PGA), a low-pass filter (LPF), and/or various programable gain cascade stages. Additionally, tuning the transmit path may include modifying frequency steps (e.g., in a stepped-frequency radar system), modifying dwell times for the frequency steps, and so forth. The monitoring device may adjust the gain on the transmit and/or receive paths based on the coupling coefficients. For instance, if the coupling coefficients are relatively large, the gain may need to be increased more than if the coupling coefficients are relatively small. The monitoring device may be configured to determine how to adjust the gains in the transmit and/or receive paths based on the coupling coefficients that indicate measures of mutual coupling between the transmitters and receivers.

After adjusting the gain on the transmit and/or receive paths, the monitoring device may cause the radar transmitters to emit additional radar signals into the environment to ensure that the energy of received signals are detectable above the receiver noise floor. For instance, the monitoring device may cause the transmitters to output radar signals according to the adjusted gain(s), and analyze sensor data generated using the radar receivers. The monitoring device may analyze the sensor data to determine a signal-to-noise ratio (SNR) and/or a spurious-free dynamic range (SFDR) of the sensor data. The monitoring device may compare the SNR/SFDR to the receiver noise floor value to determine whether or not the SNR/SFDR are greater than, equal to, or less than the receiver noise floor value. If the SNR/SFDR value(s) are less than or equal to the receiver noise floor, the monitoring device may re-adjust the gain values for the transmit and/or receive chains. However, if the SNR/SFDR value(s) are greater than the receiver noise floor, then the monitoring device may determine that the desired signal will be detectable over the noise in the environment for purposes of analyzing the desired signal (e.g., analyzing reflected signals to detect movement). In such examples, the monitoring device may proceed to an operation mode.

In the operation mode, the monitoring device may operate the radar system to perform various techniques for movement detection. For instance, the monitoring device may utilize the radar system, such as a stepped-frequency continuous wave (SFCW) radar system, to emit radar signals in different time frames (also referred to herein as "frames") in order to detect movement of objects in the environment of the device. The radar signals may be emitted according to the adjusted gain values to account for the mutual coupling. The radar transmitters may emit the radar signals in sequences of frames in order to detect movement data for objects (e.g., range, velocity, and angle) that are moving in the environment.

According to the techniques described herein, the monitoring device may determine whether the SNR/SFDR values for the transmitted signals in operation mode are greater than, equal to, or less than the receiver noise floor value. If the monitoring device determines that the SNR/SFDR value (s) are greater than or equal to the receiver noise floor, the monitoring device may continue in the operation mode and generate movement data for objects in the environment using the radar system. However, if the monitoring device determines that the SNR/SFDR values are less than or equal to the receiver noise floor, the monitoring device may transition back into the calibration mode where the gain value(s) for the transmit and/or receive paths are re-adjusted. Thus, in dynamic run-time, the monitoring device may determine whether or not the transmit/receive paths need to be tuned to ensure that sensor data representing reflected signals have SNR/SFDR values that are greater than the threshold noise floor.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 where a monitoring device calibrates a radar system to account for mutual coupling and detects movement in an environment using the radar system. The environment 100 may include a user environment 102 that includes a user 104 that is being monitored by a monitoring device 106. The monitoring device 106 may include communal devices, personal devices, and/or devices configured with sensors to detect environmental changes. In certain examples, the monitoring device 106 may be a voice-enabled device (e.g., mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These monitoring devices 106 may be situated in a home, a place of business, healthcare facility (e.g., hospital, doctor's office, pharmacy, etc.), for example. The environment 102 may also include one or more other devices, such as personal devices, which may be electronic devices, such as a mobile phone, tablet, laptop, wearable device, and/or other computing device that is specifically associated with a given user profile. Additionally, it should be understood that a given space and/or environment may include numerous monitoring devices 106 and/or personal devices. It should also be understood that when a "space" or "environment" is used herein, those terms mean an area and not necessarily a given room, building, or other structure, unless otherwise specifically described as such. The environment may also include one or more voice interface devices 108 that may be utilized to communicate with users in the environment, such as when a particular event is detected as described herein by the monitoring device 106.

The monitoring devices 106 may include one or more components, such as, for example, one or more transmitters 110 that are configured to transmit radar signals into the environment 102 (or "transmitter array"), and one or more receivers 112 that are configured to receive radar signals that are in the environment 102 (or "receiver array"). The monitoring device 106 may further include one or more processors 122, one or more network interfaces 124, memory 130, one or more radar transmitters 126, and a radar system 126 that includes the transmitter array 110, the receiver array 112, and one or more additional radar components 128 included in radar systems 126 (e.g., mixers, modulators, synchronizers, RF amplifiers, power amplifiers, multiplexers, firmware components, software components, etc.).

The monitoring device 106 may also have one or more components not depicted in FIG. 1, such as microphones that may be configured to capture audio, such as user utterances, and generate corresponding audio data, and speakers that may be configured to output audio, such as audio corresponding to audio data received from another device and/or a remote system 152. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over a network 150 and to communicate with other devices in the environment 100. As such, in each instance where a voice-enabled device is utilized, a computing device that does not include a voice interface may also or alternatively be used. The radar transmitter array 110 may be configured to produce and emit electromagnetic waves in the radio or microwave domain. One or more transmitting antennas of the monitoring device 106 may transmit the electromagnetic waves from the antenna(s) and into the environment 102 in question. The electromagnetic waves, also described herein as "transmitted energy" and "radar signals," may emanate from the antenna(s) into the environment 102 where the transmitted energy may interact with surfaces of objects in the environment and the walls of the environment 102. For example, the transmitted energy may reflect off the objects and/or walls and return to one or more receiving antennas. For example, the monitoring device 106 may include the radar receiver array 112, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the monitoring device 106 may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

The memory 130 may include one or more components such as, for example, a static-calibration component 132, a dynamic-calibration component 134, a sensor-data processing component 138, and/or an event component 140, which will be described in more detail below. It should be understood that when voice-enabled devices are described herein, those voice-enabled devices may include phones, computers, and/or other computing devices. Additionally, the monitoring device 106 may include a data store 142 (e.g., disk memory, random operating memory, etc.) that stores various data, such as coupling coefficients 144, noise floor thresholds 146, and/or gain values 148.

The static-calibration component 132 may be configured to perform a static-calibration process to determine the coupling coefficients 144 between pairs of transmitters 110 and receivers 112. The coupling coefficients 144 may generally represent a measure or strength of mutual coupling between transmitter 110 and receiver 112 pairs in the monitoring device 106. The static-calibration component 132 may enter into a static-calibration mode, such as when the monitoring device 106 powers up and/or at another preconfigured time, and the static-calibration component 132 may begin causing one or more transmitters 110 to begin emitting radar signals 114 (or waves) into the environment 102, and the receivers 112 may receive the transmitted radar signals as received radio signals 120. However, the transmitters 110 and receivers 112 of the monitoring device 106 may be located in close proximity such that the receivers 112 absorb portions of the emitted (or transmitted) radar signals 114 prior to them reflecting off objects due to mutual coupling. The portion of the emitted radio signals 114 that are received by the receivers 112 due to mutual coupling are illustrated as coupled signals 116 (undesired).

In the static-calibration mode, there may be little or no movement in the environment 102 of the monitoring device 106 (e.g., prior to the user 104 moving in the environment 102 and/or when the user 104 is not in, or not detected as moving, in the environment 102). In such examples, the received radar signals 120 may be dominated by the coupled radar signals 116 received due to mutual coupling. Accordingly, the static-calibration component 132 may analyze the received radar signals 120 with respect to the emitted radar signals 112 to determine the coupling coefficients 114 that indicate measures of the mutual coupling. For instance, because the transmit power/energy is known when the transmitters 110 transmit the emitted radar signals 114, and the energy in the received radar signals 120 will be dominated by coupled radar signals 116, the static-calibration component 132 may determine coupling coefficients 144 that indicate measurements of mutual coupling between transmitters 110 and receivers 112, such as by simply dividing the transmit energy/power of the emitted radar signals 114 by the receive energy/power of the received radar signals 120.

In some instances, the static-calibration component 132 may iteratively cause each of the transmitters 110 to emit radar signals 114 individually such that coupling coefficients 144 can be determined for each transmitter 110 with respect to each receiver 112 in the array. That is, each individual transmitter 110 in the array may emit radar signals 114 for a period of time, and all of the receivers 112 may receive the radar signals 120 for each transmitter 110. Then, coupling coefficients 144 may be determined for each transmitter 110 and receiver pair 112. The static-calibration component 132 may store the coupling coefficients 144 in the data store 142 for each transmitter 110 and receiver 112 pairing.

Additionally, the static-calibration component 132 may calculate receiver noise floor threshold(s) 146 for the radar receivers 112 in the receiver array. Generally, the noise floor thresholds 146 of the radar receivers 112 is the measure of the signal created from the sum of all the noise sources, or unwanted signals (e.g., coupled radar signals 116), that are detected by the radar receivers 112. The noise floor thresholds 146 represent the coupled radar signals 116 received by the radar receivers 112 caused by mutual coupling, as well as any noise from other unwanted sources in the environment 102 of the monitoring device 106. The receiver noise floor thresholds 146 may generally indicate the level of background/unwanted noise that is present before desirable/wanted signals (e.g., reflected signals 118) are received or detectable. The higher the receiver noise floor threshold 146, the more energy/power that desirable signals 118 must be received at by radar receivers 112 to be detected over the receiver noise floor 146.

After determining the coupling coefficients 144, the coupling component 136 may determine gain values 148 for the different transmitters 110 and receivers 112, and/or for specific pairs of transmitters 110 and receivers 112. The coupling component 136 may then use the gain values 148 determined for the transmitters 110 and receivers 112 (to account for the coupling coefficients 144) and adjust the gain tables of the transmitters 110 and receivers 112. The gain values 148 may generally represent the gain that the chains of the transmitters 110 and receivers 112 are to be tuned in order to help ensure that wanted, desirable signals (e.g., reflected signals 118) are detectable of a receiver noise floor 146 of the receivers 112.

After determining the receiver noise floor thresholds 146 and the coupling coefficients 144 for the transmitters 110 and receivers 112, the coupling component 136 may use the coupling coefficients 144 to adjust the gains for the transmitters 110 and/or receivers 112 to help ensure that wanted or desirable reflected signals 118 are detectable over the receiver noise floor thresholds 146 (e.g., greater than the measure of the coupled radar signals 116). The transmit paths and/or receive paths may be tuned to adjust the gains in the paths to help ensure that the reflected radar signals 118 received by the radar receivers 112 are received at a higher energy level than the receiver noise floor threshold 146. In some instances, tuning the transmit paths and/or receiver paths may include modifying or adjusting components 128 of the transmit or receive paths to change the gain, such as adjusting a mixer (e.g., up-conversion mixer), a programmable gain amplifier (PGA), a low-pass filter (LPF), and/or various programable gain cascade stages. Additionally, tuning the transmit path may include modifying frequency steps (e.g., in a stepped-frequency radar system), modifying dwell times for the frequency steps, and so forth. The coupling component 136 may adjust the gain on the transmit and/or receive paths based on the coupling coefficients 144. For instance, if the coupling coefficients 144 are relatively large, the gain may need to be increased more than if the coupling coefficients 144 are relatively small. The coupling component 136 may be configured to determine how to adjust the gains in the transmit and/or receive paths based on the coupling coefficients 144 that indicate measures of mutual coupling between the transmitters 110 and receivers 112.

After adjusting the gain on the transmit and/or receive paths, the static-calibration component 132 may cause the radar transmitters 110 to emit additional radar signals 114 into the environment 102 to ensure that the energy of received signals 120 are detectable above the receiver noise floor thresholds 146. For instance, the static-calibration component 132 may cause the transmitters 110 to output radar signals 114 according to the adjusted gain(s), and analyze sensor data generated using the radar receivers 112 and by the sensor-data processing component 138. The sensor-data processing component 138 may analyze the sensor data to determine a signal-to-noise ratio (SNR) and/or a spurious-free dynamic range (SFDR) of the sensor data. The sensor-data processing component 138 may compare the SNR/SFDR to the receiver noise floor thresholds 146 to determine whether or not the SNR/SFDR are greater than, equal to, or less than the receiver noise floor threshold 146. If the SNR/SFDR value(s) are less than or equal to the receiver noise floor, the coupling component 136 may re-adjust the gain values 148 for the transmit and/or receive chains. However, if the SNR/SFDR value(s) are greater than the receiver noise floor threshold 146, then the sensor-data processing component 138 may determine that the desired, reflected signals 118 will be detectable over the noise in the environment 102 for purposes of analyzing the desired, reflected signal 118 (e.g., analyzing reflected signals to detect movement). In such examples, the monitoring device 106 may proceed to the operation mode.

In the operation mode, the monitoring device 106 may operate the radar system 126 to perform various techniques for movement detection. For instance, the monitoring device 106 may utilize the radar system 126, such as a stepped-frequency continuous wave (SFCW) radar system, to emit radar signals 114 in different time frames (also referred to herein as "frames") in order to detect movement of objects in the environment 102 of the device 106. The radar signals 114 may be emitted according to the adjusted gain values 148 to account for the mutual coupling. The radar transmitters 110 may emit the radar signals 114 in sequences of frames in order to detect movement data for objects (e.g., range, velocity, and angle) that are moving in the environment 102.

According to the techniques described herein, the dynamic-calibration component 134 may determine whether the SNR/SFDR values for the emitted radar signals 114 in operation mode are greater than, equal to, or less than the receiver noise floor threshold 146. If the dynamic-calibration component 134 determines that the SNR/SFDR value(s) are greater than or equal to the receiver noise floor, the dynamic-calibration component 134 may continue in the operation mode and generate movement data for objects in the environment 102 using the radar system 126. However, if the dynamic-calibration component 134 determines that the SNR/SFDR values are less than or equal to the receiver noise floor threshold 146, the dynamic-calibration component 134 may transition back into the calibration mode where the gain value(s) 148 for the transmit and/or receive paths are re-adjusted. Thus, in dynamic run-time, the dynamic-calibration component 134 may determine whether or not the transmit/receive paths need to be tuned to ensure that sensor data representing reflected signals have SNR/SFDR values that are greater than the threshold noise floor.

Accordingly, the components of the monitoring device 106 may use static and/or calibration processes in order to tune a radar system 126 to help ensure that received radar signals 120 are not dominated by coupled radar signals 116. The calibration processes described herein help tune the gain for transmitter 110 and receiver pairs 112 based on calculated coupling coefficients that represent the measure or strength of the mutual coupling between the transmitter/receiver pairs. In this way, the received radar signals 120 may be dominated by, or more strongly represent, the reflected signals 118 (desired) as compared to the coupled radar signals 116. This may be advantageous for the various monitoring techniques that the monitoring device 106 is performing.

Radar systems 126 may be used to monitor movement in an environment 102 for various reasons, including health-industry reasons. For instance, radar systems can be used to detect and monitor vital signals of humans (e.g., respiration, heart-beat rate, etc.), fall-detection for humans that may require emergency services, and/or other health applications, in a non-contact and unobtrusive manner. Various radar systems 126 may be used, and techniques for an example radar system 126 (e.g., MIMO) is described below. However, it is understood that other types of techniques and/or technologies may be used and benefit from the calibration techniques described herein.

The radar transmitter(s) 110 may be configured to produce and emit electromagnetic waves in the radio or microwave domain. One or more transmitting antennas of the monitoring device 106 may transmit the electromagnetic waves from the antenna(s) and into the environment in question. The electromagnetic waves, also described herein as "transmitted energy," may emanate from the antenna(s) into the environment 102 where the transmitted energy may interact with surfaces of objects in the environment and the walls of the environment. For example, the transmitted energy may reflect off the objects and/or walls and return to one or more receiving antennas. For example, the monitoring device 106 may include the radar receiver array 112, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). The receivers 112 may receive the reflected radar signals 118 and be used to generate sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

Utilizing the sensor data, the sensor-data processing component 138 may determine points corresponding to portions of objects in the environment 102. In addition, the intensity of the energy received back at the monitoring device 106 may be determined. These points may indicate Cartesian coordinates for points corresponding to surfaces in the environment and energy intensity associated with some or each of those points. In examples, the points may represent an averaging of locations associated with reflected energy and intensity of the reflected energy over a period of time. The sensor-data processing component 138 may be configured to generate a point cloud representing rates of energy intensity change associated with the environment 102. For example, a given coordinate of the points may be associated with a first energy intensity and an adjoining or other associated coordinate may be associated with a second energy intensity. In examples where there is a large rate of change of those intensities, the rate of change may indicate the presence of a surface and/or object. In examples where there is a small rate of change, an object may not be present and/or a small object may be present instead of a large object. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment 102 in question. The result may include generation of data representing a point cloud of the environment 102 with points on the point cloud representing points of high energy intensity and/or high rates of energy intensity change. The generation of the point clouds as described herein may be based at least in part on a two-dimensional constant false alarm rate algorithm. The sensor-data processing component 138 may also be configured to determine one or more sectors of the point cloud. For example, groupings and/or clusters of points in a given area may be determined to be a sector. The sectors may also include an amount of space outside the grouping of points.

The sensor-data processing component 138 may be configured to utilize the data representing the point cloud to determine a velocity of a given object in the environment 102, such as in multiple directions. For example, the sensor-data processing component 138 may be configured to determine a velocity of a given object in a first direction, also described herein as the X direction, which may be a direction that is substantially toward and away from the device 106 that transmits and/or receives the energy from the environment 102. In some examples, the sensor-data processing component 138 may further be configured to determine a velocity of the object in a second direction, or the X direction, which may be a direction that is vertical (or up and down) with respect to the monitoring device 106.

The velocity may be relatively large in some use cases, and relatively small in other use cases. For instance, in cases where the monitoring device 106 is performing fall-detection techniques, the velocity may be fairly large when the event component 140 detects a fall event 140 for the user 104. Further, subtle variations in the velocity may be typical, such as when certain pauses or decreases in velocity as each step is taken when the person is walking in a room. However, when a person experiences a fall event, the velocity may go from a steady rate and then decreases suddenly, such as to 0. As another example, the velocity may be periodic and relatively small, and may represent a human taking breaths and/or vital signs. The event component 14 may determine that that the velocity of the vital signs and/or breathing is periodic, and if it stops or goes below a threshold, then the event component 140 may determine that the person being monitored is experiencing a health event and may need help or assistance.

Accordingly, the event component 140 may analyze sensor data and may compare velocity values indicated by the sensor data are problematic. If the person being monitored is walking, the velocity of the person may be determined and compared to threshold velocity values or changes that indicate a fall that may be problematic. In another example, if the velocity values are indicative of vital signs or breathing of a person, the event component 140 may compare the velocity values to threshold velocity values to determine whether a change in the velocity and/or the velocity values indicate a problematic event (e.g., vitals drop below threshold, breathing drops below threshold, etc.).

Upon determining that a potentially problematic event has occurred by monitoring the velocity of objects in the environment, the event component 140 may perform various operations. For instance, the monitoring device 106 may cause output of audio in the environment 102 requesting user input confirming or denying that the event occurred and/or to establish a communication channel with another device, such as a device associated with emergency services and/or an emergency contact. Other actions are also included in this disclosure, such as sending notifications to one or more devices, sounding an alarm, dispatching emergency services, gathering additional information about the environment, etc.

In some instances, the monitoring device 106 may send information about a user 104 and/or event to a remote system 152 and via one or more networks 150. The data indicating that an event has been detected as well as the data associated with the event may be utilized to train the machine-learning models 156 to improve the accuracy of subsequent fall detection, such as for the environment in question and/or other environments universally. The remote system 152 may include its own processor(s), network interface(s), and/or memory. As such, by way of example, the remote system 152 may include and/or be associated with processor(s), network interface(s), and/or memory. The remote system 104 may be comprise or include various cloud-based computing resources, such as web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The remote system 152 may include a user registry 158 that may store user account data associated with the monitoring device 106 at issue, the environment 102, and/or one or more attributes of objects in the environment 102. This information may be utilized by the monitoring device 106 to determine whether an event has occurred and/or to whom the event should be attributed. For example, the user account data may indicate a position of the monitoring device 106 as placed by a user in the environment. Additionally, or alternatively, the user account data may be utilized to indicate attributes of users 104 in the environment 102, such as which users 104 are associated with given personal devices such as mobile phones, the heights of such users, user categories such as adult or child, a number of users in the environment, the ages of users, etc. In these examples, this user account data may be utilized to identify the person involved in an event and/or to determine what action to take in response to detecting the event, for example.

The user registry 158 may store associations between users, user accounts, and/or devices. For example, one or more associations between user accounts may be identified, determined, and/or generated by the user registry 158. The user registry 158 may additionally store information indicating one or more applications and/or resources accessible to and/or enabled for a given user account. Additionally, the user registry 158 may include information indicating device identifiers, such as naming identifiers, associated with a given user account, as well as device types associated with the device identifiers. The user registry 158 may also include information indicating user account identifiers, naming indicators of devices associated with user accounts, and/or associations between devices, such as the devices 106. The user registry 158 may also include information associated with usage of the devices 106. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data.

The machine-learning models 156 may be trained by the remote system 152 to perform predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning. Generally, the machine-learning models 156 may be trained to identify events represented in sensor data (and/or in another format), which may be represented as vectors or another mathematical representation. The machine-learning models 156 may be trained to determine what sensor data indicates events (e.g., trends or changes in sensor data overtime). The machine-learning models 156 may be provided to the monitoring devices 106 for use, and/or the monitoring device 106 may transmit sensor data (in any format) to the remote system 1532 for processing.

When the remote system 152 includes a speech-processing system, that system may include an automatic speech recognition component (ASR), a natural language understanding component (NLU), and/or a text-to-speech component (TTS). Each of the components described herein with respect to the remote system 152 may be associated with their own systems, which collectively may be referred to herein as the remote system 152, and/or some or all of the components may be associated with a single system. Additionally, the remote system 152 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to the TTS component, a link or other resource locator for audio data, and/or a command to a device, such as the device 106.

In instances where a voice-enabled device is utilized, skills may extend the functionality of devices 106 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device, and send data and/or instructions associated with the input to one or more other devices.

Figure 2:
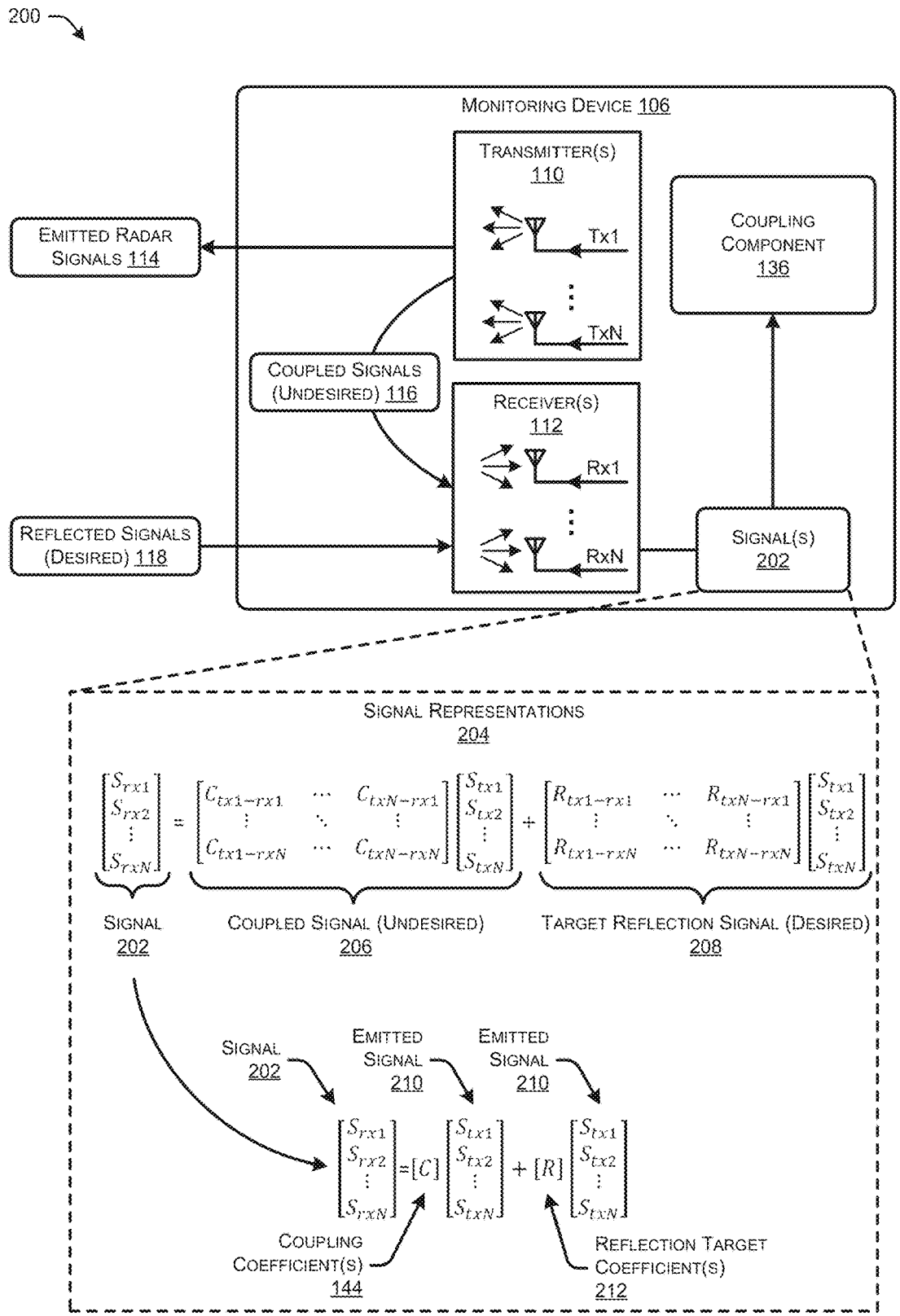
FIG. 2 illustrates an example diagram illustrating a mathematical representation of a signal generated by a radar system that includes an undesirable coupled signal as well as a desired target reflection signal.

FIG. 2 illustrates an example diagram 200 illustrating a mathematical representation of a signal generated by a radar system that includes an undesirable coupled signal as well as a desired target reflection signal.

As illustrated, the transmitters 110 may emit one or more emitted radar signals 114 into an environment 102 of the monitoring device 106. In some instances, the radar system 126 is a stepped frequency continuous wave (SFCW) radar that operates anywhere in the range from about 5 megahertz (MHz) to about 130 gigahertz (GHz), and may operate in steps at various frequency steps (e.g., 10 MHz, 25 MHz, 100 MHz, etc.). The receivers 112 may receive coupled signals 116 due to undesirable mutual coupling, and may also receive reflected signals 118 that correspond to reflections of the emitted radar signals 114 off objects in the environment 102. The receivers 112 may be used to generate one or more signals 202 that represent the coupled signals 116 and the reflected signals 118. The signals 202 may be sent to the coupling component 136 in order to determine coupling coefficients 144.

FIG. 2 illustrates one or more signal representations 204 of the signal(s) 202. As illustrated, a signal 202 may be mathematically represented as including a coupled signal 206 (undesired) and a target reflection signal 208 (desired). The coupled signal 206 may be represented as a product of the power/energy at which the signal 202 was transmitted by one or more of the transmitters 110 and the coupling coefficients 144 determined for pairs of the transmitters 110 and receivers 112. Similarly, the target reflection signal 208 may be represented as a product of the power/energy at which the signal 202 was transmitted by one or more of the transmitters 110 and the reflectivity of the object(s) that reflect the emitted radar signals 114 as transmitted by transmitters and that are received by receivers 112 that are paired with the transmitters 110. The signal 202 is also illustrated in FIG. 2 as corresponding to the coupling coefficient(s) multiplied by the emitted signal 210 power/energy in combination with the reflection target coefficients 212 multiplied by the emitted signal 210 power/energy.

Figure 3:
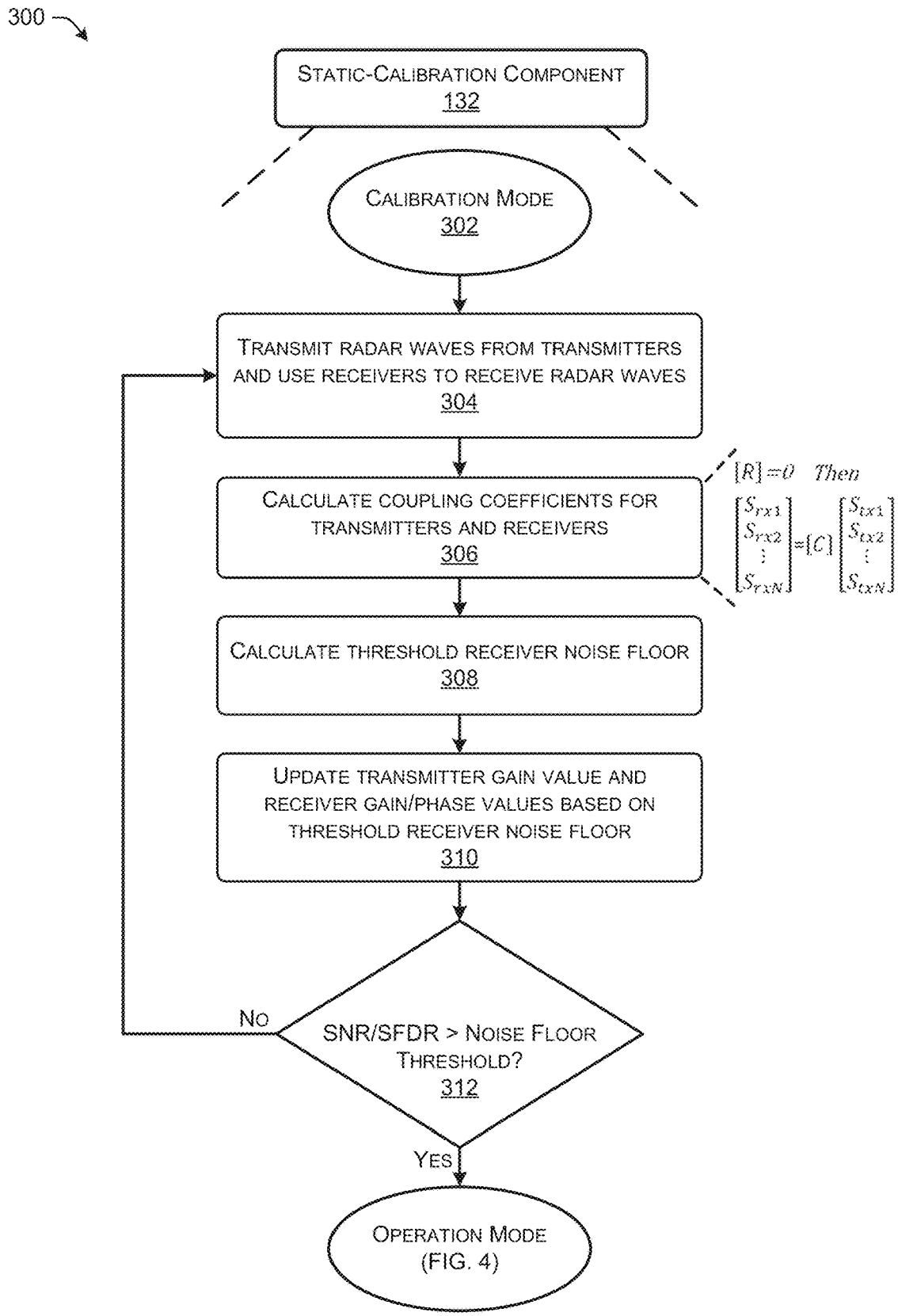
FIG. 3 illustrates a flow diagram of an example calibration mode where a monitoring device identifies amounts of mutual coupling between transmitter and receiver pairs, and also determines a threshold noise floor, in a static environment.

FIG. 3 illustrates a flow diagram 300 of an example calibration mode 302 where a monitoring device 106 identifies amounts of mutual coupling between transmitter and receiver pairs, and also determines a threshold noise floor, in a static environment. In some instances, the monitoring device 106 may enter the calibration mode 302 due to various factors or triggers. For instance, the monitoring device 106 may enter the calibration mode 302 at various times or due to various triggers, such as when the monitoring device 106 powers up and/or at another preconfigured time (e.g., no movement detected in an environment 102).

Once the monitoring device 106 has entered the calibration mode 302, the static-calibration component 132 may begin performing operations for a static-calibration process. At 304, the static-calibration component 132 may begin transmitting radar waves (e.g., emitted radar signals 114) from one or more transmitters 110, and use one or more receivers 112 to receive radar waves (e.g., coupled radar signals 116). At 306, the static-calibration component 132 may calculate coupling coefficients 144 for the transmitters 110 and receivers 112 (e.g., one or more coupling coefficients 144 indicating mutual coupling between pairs of transmitters 110 and receivers 112). For instance, because the transmit power/energy is known, and the energy in the received radar signals 120 will be dominated by coupled signals, the static-calibration component 132 may determine coupling coefficients 144 that indicate measurements of mutual coupling between transmitters 110 and receivers 112, such as by simply dividing the transmit energy/power of the emitted radar signals 114 by the receive energy/power of the received radar signals 120. In some instances, the static-calibration component 132 may iteratively cause each of the transmitters 110 to emit radar signals individually such that coupling coefficients 144 can be determined for each transmitter 110 with respect to each receiver 112 in the array.

At 308, the static-calibration component 132 may calculate a threshold receiver noise floor values 146 for the radar receivers 112 in the receiver array. Generally, the noise floor thresholds 146 of the radar receivers 112 is the measure of the signal created from the sum of all the noise sources, or unwanted signals (e.g., coupled radar signals 116), that are detected by the radar receivers 112. The noise floor thresholds 146 represent the coupled radar signals 116 received by the radar receivers 112 caused by mutual coupling, as well as any noise from other unwanted sources in the environment 102 of the monitoring device 106. The receiver noise floor thresholds 146 may generally indicate the level of background/unwanted noise that is present before desirable/wanted signals (e.g., reflected signals 118) are received or detectable. The higher the receiver noise floor threshold 146, the more energy/power that desirable signals 118 must be received at by radar receivers 112 to be detected over the receiver noise floor 146. The static-calibration component 132 may determine the noise floor thresholds 146 by determining an amount of energy/power of the received signals (which may be dominated by the coupled radar signals 116), and determine that the noise floor threshold value 146 corresponds to the amount of energy/power of the received signals while in the calibration mode 302.

At 310, the static-calibration component 132 may update transmitter gain values 148 and/or receiver gain/phase values 148. For instance, the static-calibration component 132 may determine gain values 148 for the different transmitters 110 and receivers 112, and/or for specific pairs of transmitters 110 and receivers 112. Generally, the gain values 148 represent the gain that the chains of the transmitters 110 and receivers 112 are to be tuned in order to help ensure that wanted, desirable signals (e.g., reflected signals 118) are detectable of a receiver noise floor 146 of the receivers 112.

Updating the gain values may include updating Tx/Rx gain states for the radar system 126. For instance, a first gain state may be a gain of 0 decibels (dBs), a second gain state may be a gain of 1.5 dBs, and an Nth gain state may be a gain of 12 dBs. The gain values 148 may represent the gain between the transmitter/receiver pairs.

At 312, the static-calibration component 132 may determine whether a SNR/SFDR is greater than (or equal to) the noise floor threshold. For instance, the SNR may be 10 dBs, and the receiver noise floor threshold 146 may be 2.5 dBs. In such examples, the static-calibration component 132 may cause the monitoring device 106 to proceed to an operation mode in FIG. 4. If the static-calibration component 132 determines that the SNR/SFDR is less than the noise floor threshold, the static-calibration component 132 may return to step 304 and recalculate gain values 148 for the radar system 136 (e.g., Tx/Rx pairs).

Figure 4:
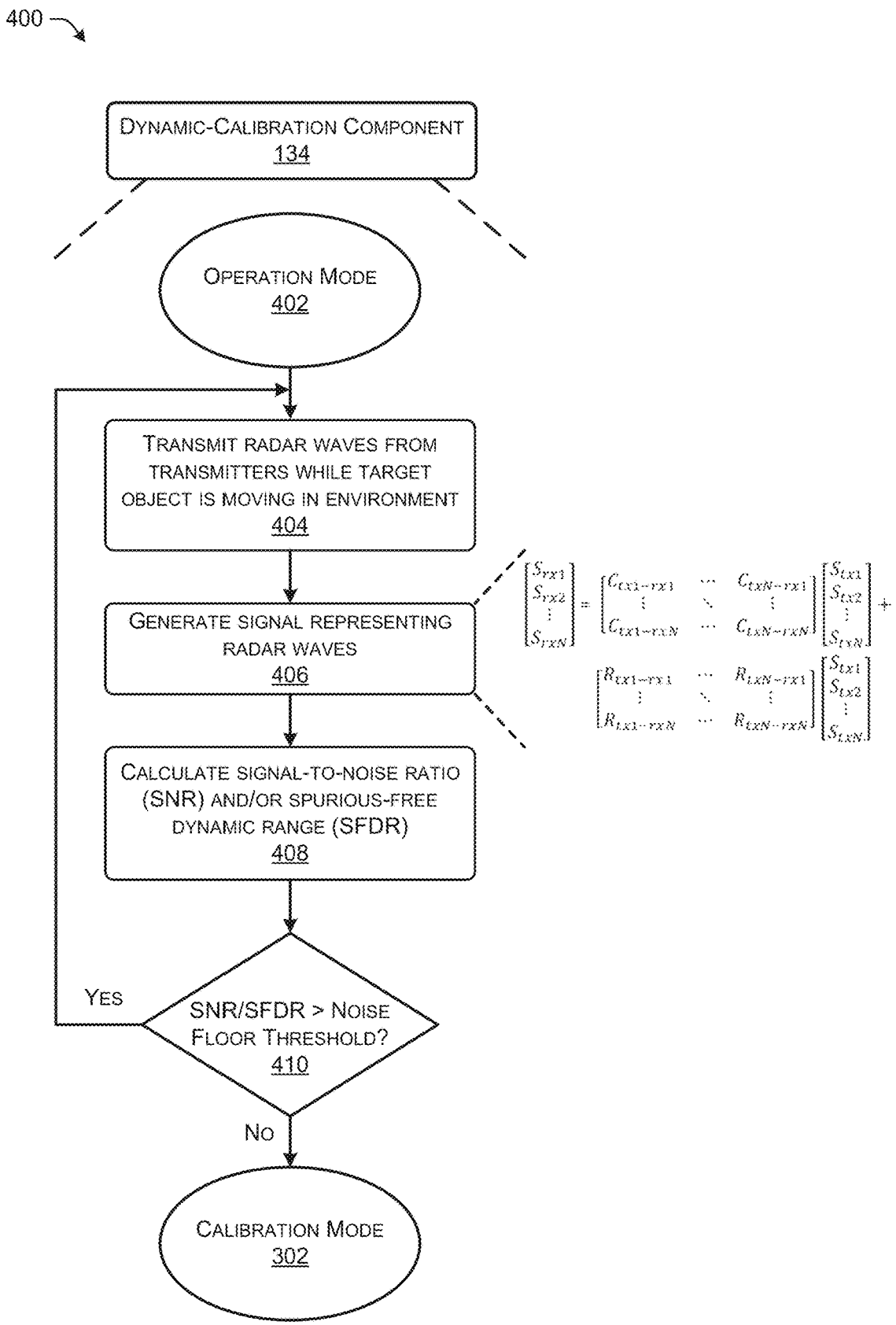
FIG. 4 illustrates a flow diagram of an example operation mode where a monitoring device determines whether a signal-to-noise ratio (SNR) and/or spurious-free dynamic range (SFDR) is greater than a noise floor threshold associated with the environment.

FIG. 4 illustrates a flow diagram 400 of an example operation mode 402 where a monitoring device 106 determines whether a SNR and/or SFDR is greater than a noise floor threshold 146 associated with the environment. In some instances, the monitoring device 106 may enter the operation mode 402 due to various factors or triggers. For instance, the monitoring device 106 may enter the operation mode 402 at various times, and/or continuously after the calibration mode 302, in order to monitor the environment 102 and one or more users 104. In some instances, the monitoring device 106 may enter the operation mode 402 upon detecting movement in the environment 102.

Once the monitoring device 106 has entered the operation mode 402, the dynamic-calibration component 134 may begin performing operations for movement detection for various monitoring activities (e.g., vital-sign monitoring, fall detection, etc.). At 404, the dynamic-calibration component 134 may begin transmitting radar waves (e.g., emitted radar signals 114) from one or more transmitters 110 while one or more target objects are moving in the environment 102. Generally, a target object is an object that the monitoring device 106 is monitoring for movement. In some instances, there may be multiple target objects, or multiple users 104, in the environment 102. At 406, the dynamic-calibration component 134 may use the radar receivers 112 to generate one or more signals 202 that represent radar waves. In some instances, the generated signal(s) may represent reflected radar signals 118 as well as coupled radar signals 116, and potentially other signals from the environment 102 (e.g., other sources of noise).

At 408, the dynamic-calibration component 134 may calculate SNR and/or SFDF values for the signals 202. The SNR values may represent a strength of the desired signal (reflected signals 118) expressed as a ratio with respect to undesired signals (coupled radar signals 116).

At 410, the dynamic-calibration component 134 may determine whether the SNR and/or SFDR values are greater than (or equal to) the noise floor threshold 146. If the dynamic-calibration component 134 determines that the SNR and/or SFDR is less than the noise floor threshold(s) 146, the dynamic-calibration component 134 may continue in the operation mode 402 and continue transmitting radar waves from the transmitters 110 at the set gain values 148. Conversely, if the dynamic-calibration component 134 determines that the SNR/SFDR is greater than the noise floor threshold 146, the dynamic-calibration component 134 may transition the monitoring device 106 back into the calibration mode 302.

Figure 5:
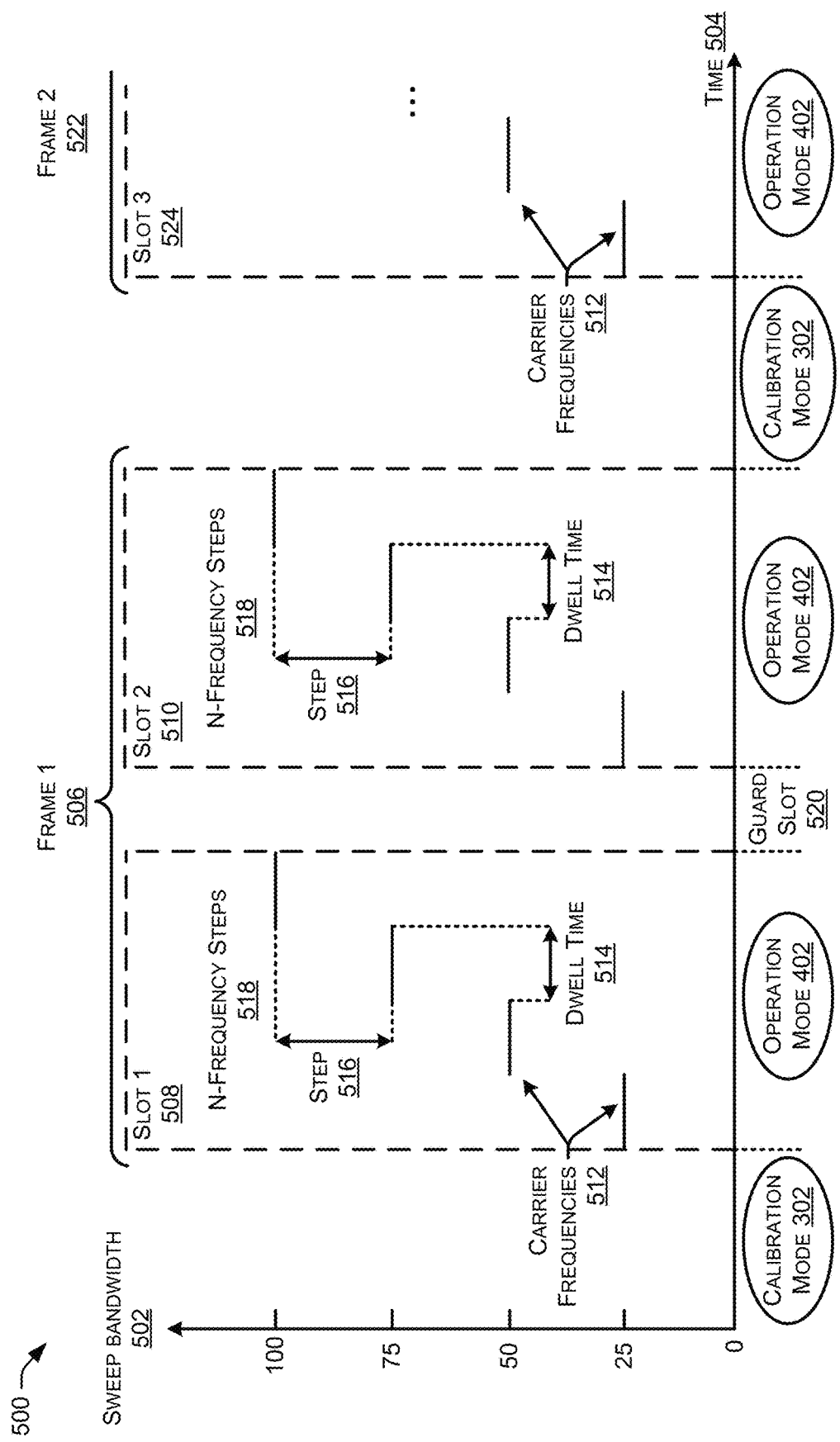
FIG. 5 illustrates an example diagram illustrating radar frames that depict a step-frequency waveform of a radar wave in the time domain, as well as timing for calibration modes and operation modes in the time domain.

FIG. 5 illustrates an example diagram 500 illustrating radar frames that depict a step-frequency waveform of a radar wave in the time domain, as well as timing for calibration modes and operation modes in the time domain. The radar system 126 may be a stepped-frequency continuous wave (SFCW) radar system, which may be utilized for various monitoring techniques, such as remote monitoring of vital signs of human application and fall detection. For instance, the radar system 126 may utilize the phase information for the signal processing to derive the tiny vibrations of the chest and the motion pattern of a user 104.

Generally, the radar technologies include using electromagnetic waves that are transmitted to the object and gets reflected from the object of interest. This returned energy is called an echo or reflection. Radar systems 126 can use the echo to determine various information such as the direction, distance and velocity of the reflecting object. The radar system 126 can transmit microwave signals, which can either be a single tone or a pulse, through the environment 102. When the emitted signals hit an object in the environment 102, Ie, the signal is reflected off the object back to the radar system 126 where the reflection of the signal can be in towards any direction, but only the part that is captured by the receiving antenna is of interest to the radar system 126. The radar system 126 then analyzes the differences between the original transmitted signal and the reflected signal to provide useful information such as distance (based on the time delay between transmission and reception), size (based on the signal intensity), and velocity (based on phase and Doppler shift) of an object with respect to the radar system 126.

Various types of radar systems 126 may be utilized, such as a continuous wave (CW) Doppler radar, ultra-wide band impulse radar, and stepped-frequency continuous wave (SFCW) or frequency-modulated continuous wave (FMCW) radar. The techniques of FIG. 5 may be implemented by a SFCW radar system 126.

Generally, the radar system 126 may operate in a sweep bandwidth range 502, which may be tunable, and may be different bandwidth sweep ranges (e.g., one GHz, 2 GHz, etc.). The operating frequency of the waveform of the SFCW radar system 126 may linearly increase in discreate steps 516 over the sweep bandwidth 502. The steps 516 may increase from an initial carrier frequency 512 to an N-frequency step 518. The step 516 may be tunable as well, and may be of different frequency step sized (e.g., 20 MHz, 50 MHz, 10 MHz, etc.). Similarly the dwell time 514, or the amount of time the transmitters 110 transmit at a particular carries frequency 512, may be tunable based on desired gain values for the radar system 126.

In some instances, the monitoring device 106 may cause at least a first group of the transmitters 110 to emit signals according to the carrier frequencies 512, frequency steps 518, and for the sweep bandwidth, during slot 1. For instance, a first group (e.g., ¼, ½, ¾, etc.) of the transmitters 110 may emit signals in the operation mode 402 and in slot 1 508 according to the sweep bandwidth 502, steps 516, and carrier frequencies 512. The transmitters 110 may stop emitting radar signals during the guard slot 520 (e.g., predefined period of time), and then a second group (e.g., ¼, ½, ¾, etc.) of the transmitters 110 may emit signals in the operation mode 402 and in slot 2 510 according to the sweep bandwidth 502, steps 516, and carrier frequencies 512. The two slots (slot 1 508 and slot 2 510) along with the guard slot 520 may be part of frame 1 506. In this way, the transmitters 110 may emit radar signals into an environment 102 of the monitoring device 106 when the radar system 126 is a SFCW radar system 126. However, the number of slots, steps, dwell times, etc. may vary and be configurable depending on the MIMO array, radar protocol, and desired gain values 148.

While in the operation mode 402 during the frame 1 506, and/or just after the end of frame 1, the dynamic-calibration component 134 may re-calculate the SNR and/or SFDR values along with the noise floor threshold 146, as described in FIG. 4. As described in FIG. 4, the dynamic-calibration component 134 may determine whether the SNF/SFDR values are greater than or equal to the noise floor threshold (e.g., at step 410), and if the are not greater than the noise floor threshold, then the dynamic-calibration component 134 may cause the monitoring device 106 to enter into the calibration mode 302 in between frames 1 506 and 2 522. During the calibration mode 302, the static-calibration component 132 may re-calculate coupling coefficients 144 and gain values 148 for the radar system 126 and adjust the gains of the transmitter chains and/or receiver chains to account for the new coupling coefficients.

After adjusting the gain values (if needed) in calibration mode 302 and between the frames 506 and 522, the monitoring device 106 may then move back into the operation mode 402 and cause the transmitters 110 to emit radar signals in frame 2 522 where the radar system 126 is using the updated gain values 148 to help ensure that the SNR/SFDR is greater than or equal to the noise floor thresholds 146. To adjust the gain of the radar system 126, as noted above, one or more of the carrier frequencies 512, dwell time 514, frequency steps 518, and/or sweep bandwidth 502 may be modified.

Figure 6:
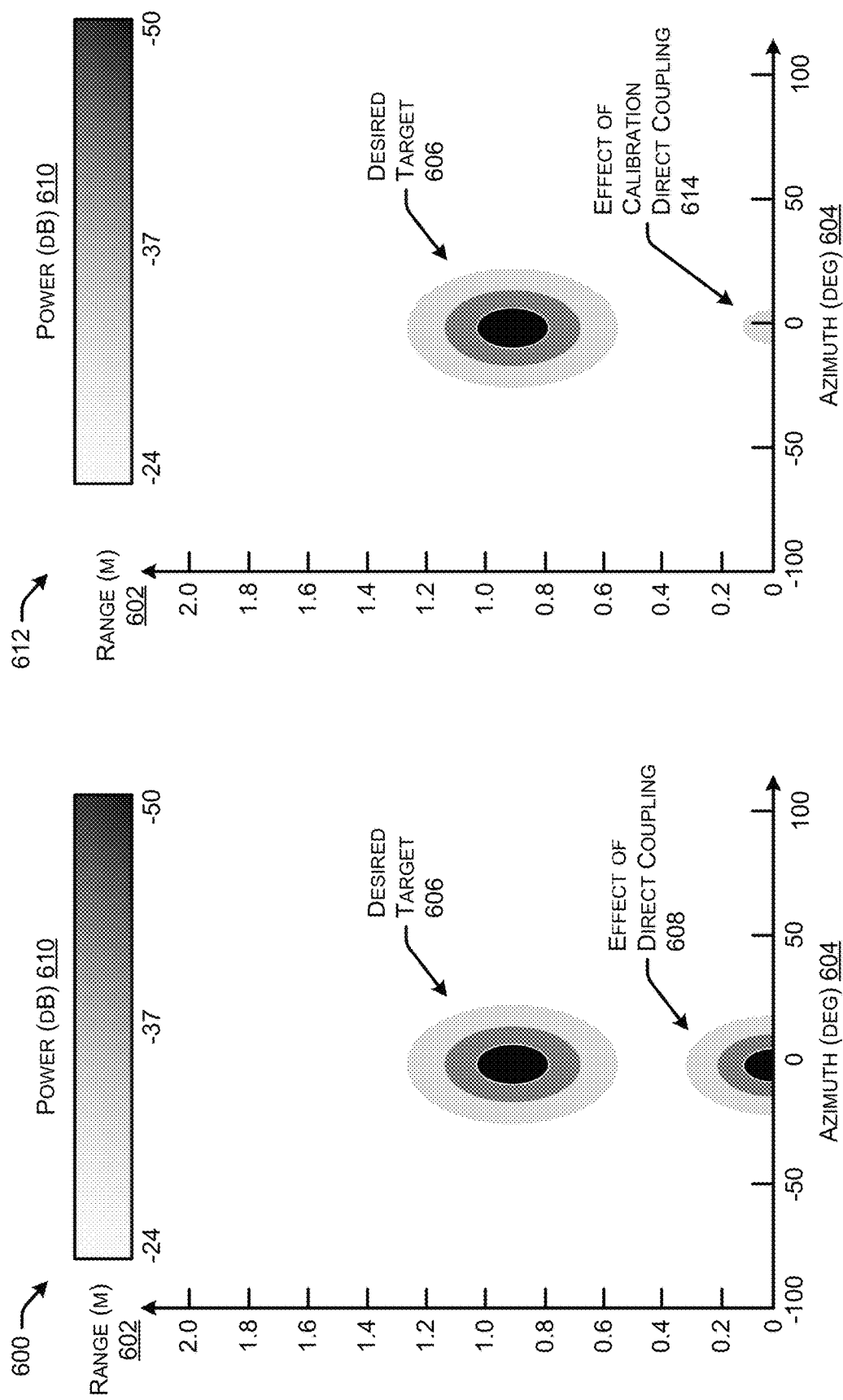
FIGS. 6A and 6B illustrate example diagrams of Range-Azimuth heatmap plots that illustrate radar frames with direct coupling, and with the effect of calibration for the direct coupling.

FIGS. 6A and 6B illustrate example diagrams of Range-Azimuth heatmap plots that illustrate radar frames with direct coupling, and with the effect of calibration for the direct coupling.

FIG. 6A illustrates an example diagram 600 of a Range-Azimuth heatmap plot illustrating a radar frame with direct coupling for which the radar system 126 has not been calibrated. The diagram 600 illustrates a plot across all range bins and all radar antennas, and for at least one frame. As illustrated, the Range-Azimuth heatmap plot has Azimuth (degrees) 604 on the x-axis, and range (meters) 602 plotted along the y-axis. As illustrated, the desired target 606 in the environment is somewhere around 0.8 meters to 1.3 meters. Further, the effect of direct coupling 608 is observed somewhere between 0 meters (in or at the device 106) and 0.3 meters. As shown, the desired target 606 and the effect of direct coupling 608 have relatively similar power ranges (e.g., upper range of −45 50 −50 dB). Thus, the effect of direct coupling 608 is causing the monitoring device 106 to, incorrectly, determine that movement of an object is occurring at, or in close proximity, to the monitoring device 106. However, this effect of direct coupling 608 is a false negative, and the illusion of movement in/at the device 106 is caused by undesirable mutual coupling. As illustrated, the power (dB) scale 610 may range from −24 dB to −50 dB, but any other range may also be usable as described herein.

FIG. 6B illustrates another example diagram 612 of a Range-Azimuth heatmap plot illustrating a radar frame with direct coupling for which the radar system 126 has been calibrated. The diagram 612 illustrates a plot across all range bins and all radar antennas, and for at least one frame. As illustrated, the Range-Azimuth heatmap plot has Azimuth (degrees) 604 on the x-axis, and range (meters) 602 plotted along the y-axis. As illustrated, the desired target 606 in the environment is somewhere around 0.8 meters to 1.3 meters, and has a higher end power at −45 dB to −50 dB (illustrated as black in the diagram). Further, the effect of direct coupling 608 is observed somewhere between 0 meters (in or at the device 106) and 0.3 meters. However, in this example the effect of calibration on direct coupling 614 indicates that the direct coupling has a much lower power range when captured by the receivers 112 (e.g., −24 dB to −30 dB and represented as grey on the plot). Thus, the effect of calibration on direct coupling 614 has caused the power range from the mutual coupling to be much lower than the power range of the effect of direct coupling 608 in FIG. 6A (without calibration). As shown, the effect of calibration on direct coupling 614 causes the power range to be more in range of −24 dB to −30 dB on the upper end, rather than −45 dB to −50 dB on the upper end as shown in FIG. 6A. accordingly, the effect of calibration may reduce the effect of direct coupling (or mutual coupling) and reduce the number of false negatives of movement in the environment due to mutual coupling.

Figure 7:
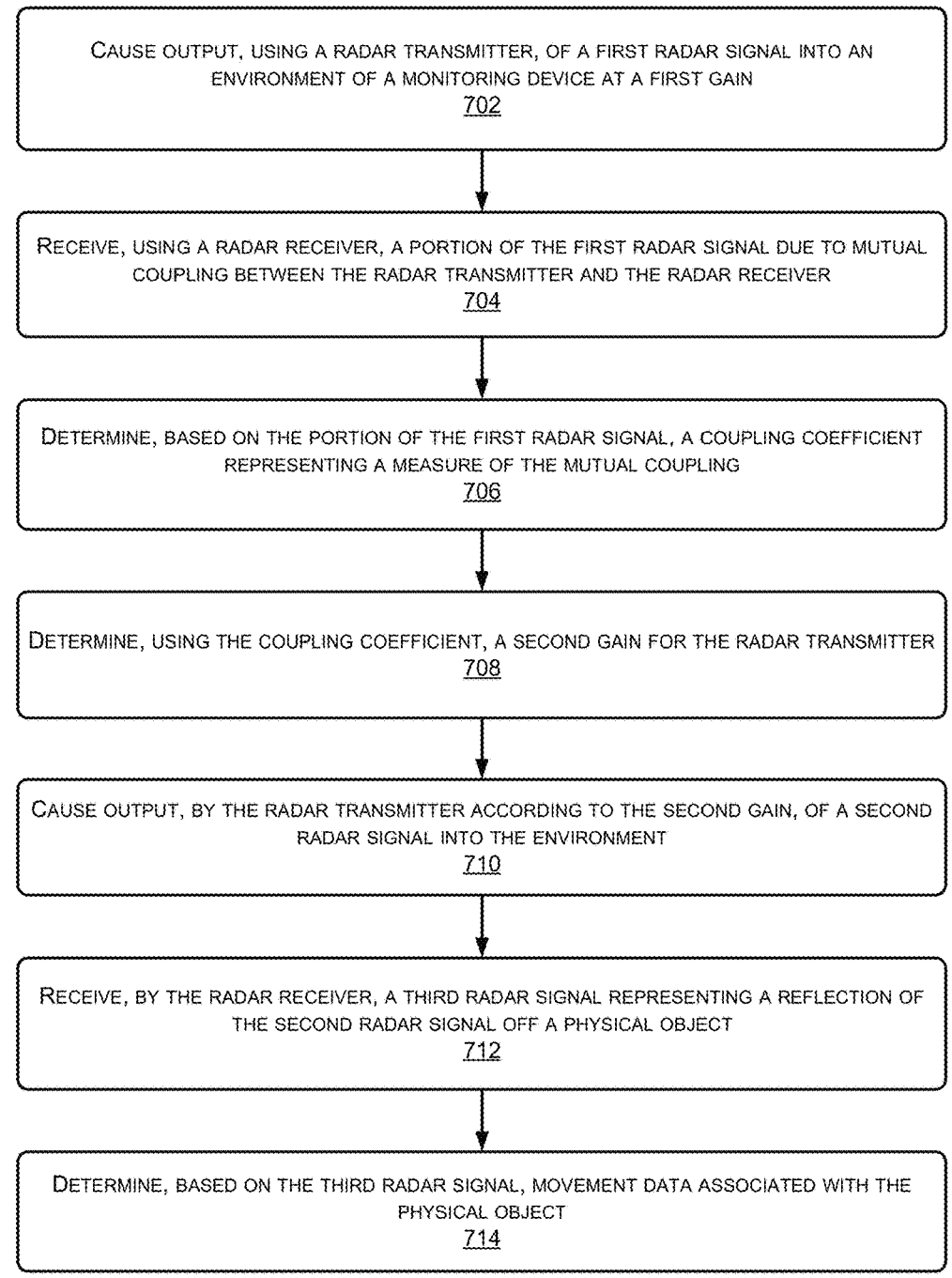
FIG. 7 illustrates a flow diagram of an example process for calibrating a radar transmitter and radar receiver to remove undesirable effects of mutual coupling.
Figure 8:
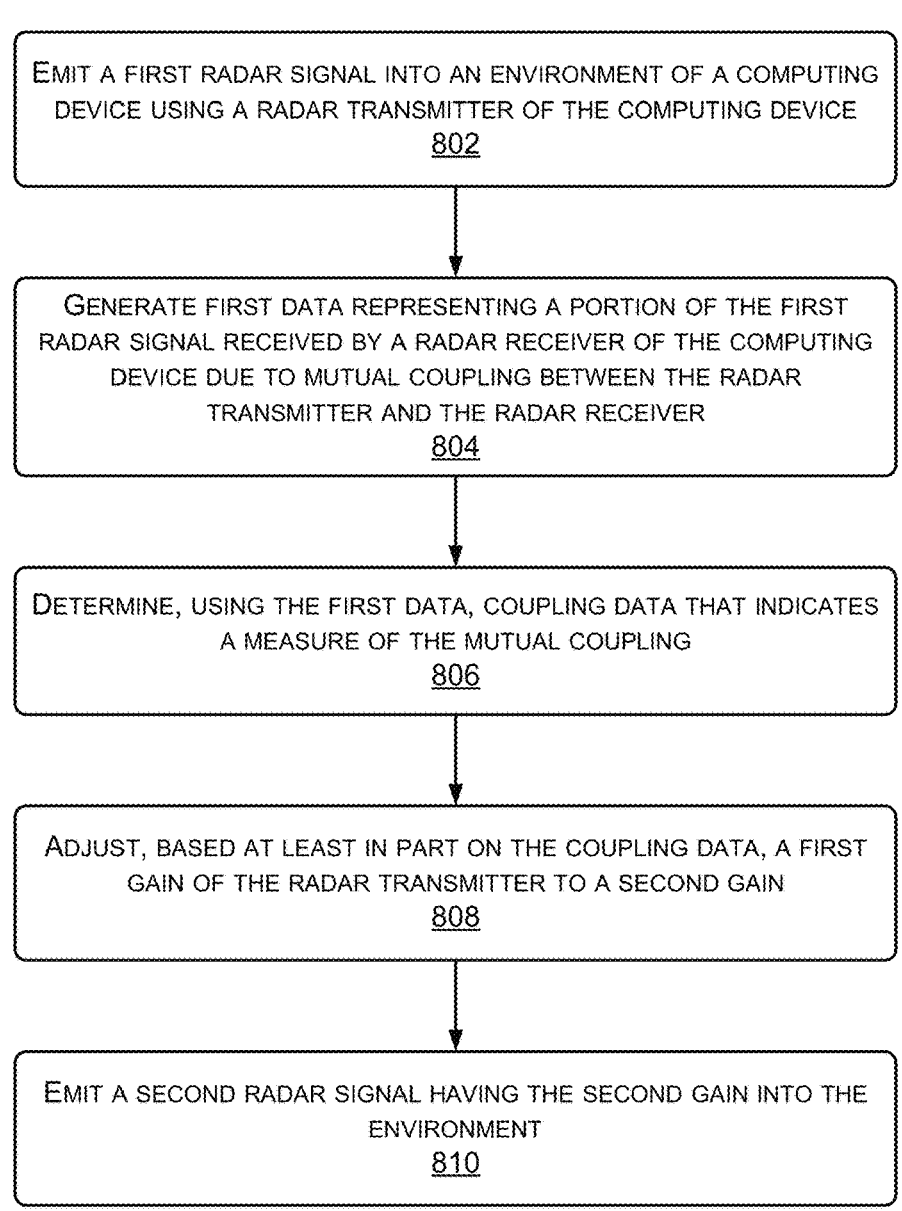
FIG. 8 illustrates a flow diagram of an example process for calibrating at least one of a radar transmitter and/or radar receiver to remove undesirable effects of mutual coupling.

FIGS. 7 and 8 illustrate flow diagrams of an example processes 700 and 800 for performing the techniques described herein. The processes 700 and 800, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

FIG. 7 illustrates a flow diagram of an example process 700 for calibrating a radar transmitter 110 and radar receiver 112 to remove undesirable effects of mutual coupling. In some instances, the monitoring device 106 may include a radar transmitter 110 configured to transmit radar signals (e.g., emitted radar signals 114) according to a first gain (e.g., a first gain value 148). Further, the monitoring device 106 may include a radar receiver 112 configured to receive the first radar signals according to a second gain (e.g., gain values 148). The monitoring device may include one or more processors and one or more computer-readable media storing computer-executable instructions that, when executed by the one or more processors, cause the one or more processors to perform the operations of process 700.

At 702, the monitoring device 106 may cause output, using the radar transmitter 110, of a first radar signal 114 into an environment 102 of the monitoring device 106. For instance, the radar transmitter 110 may emit one or more emitted radar signals 114 according to a stepped frequency continuous wave (SFCW) protocol that operates anywhere in the range from about 5 megahertz (MHz) to about 130 gigahertz (GHz), and may operate in steps at various frequency steps (e.g., 10 MHz, 25 MHz, 100 MHz, etc.).

At 704, the monitoring device 106 may receive, using the radar receiver 112, a portion of the first radar signal due to mutual coupling between the radar transmitter 110 and the radar receiver 112. For instance, the radar transmitter 110 and the radar receiver 112 may be in close enough proximity in the device 106 such that a coupled radar signal 116 (undesired) is received by the radar receiver 112 due to mutual coupling and before the emitted radar signal 114 is able to reflect off objects in the environment 102 and exterior the monitoring device 106.

The monitoring device 106 may generate first data representing the portion of the first radar signals. For instance, the monitoring device 106 may generate sensor data that indicates an energy and/or power measure of the portion of the first radar signals (e.g., an energy or power of the coupled radar signals 116).

At 706, the monitoring device 106 may determine, based on the portion of the first radar signal, a coupling coefficient 144 representing a measure of the mutual coupling. For instance, because the transmit power/energy is known for the first radar signals, and the energy in the received portion of the first radar signals will be dominated by coupled signals, the monitoring device 106 may determine coupling coefficients 144 that indicate measurements of mutual coupling between radar transmitter 110 and the radar receiver 112, such as by simply dividing the transmit energy/power of the transmitted first radar signals by the receive energy/power of the received portion of the first radar signals.

At 708, the monitoring device 106 may determine, using the coupling coefficient 144, a second gain for the radar transmitter 110. For instance, the monitoring device 106 may update gain tables and/or gain values 148, for the radar transmitter 110. The third gain may help ensure that the coupled radar signals 116 do not interfere with the event component's 140 ability to accurately detect movement in the environment 102.

At 710, the monitoring device 106 may cause output, by the radar transmitter 110 and according to the second gain 148, of a second radar signal into the environment 102. Additionally, at 712, the monitoring device 106 may receive, by the radar receiver 112, a third radar signal representing a reflection of the second radar signal off of a physical object in the environment 102. For instance, the radar system 126 may begin performing movement-detection techniques according to the new gain value(s) 148 that were determined to help ensure that the movement-detection techniques are not interfered by the mutual coupling between the transmitter 110 and receiver 112. The monitoring device 106 may generate second data representing the third radar signal. The third radar signal may be received radar signals 120 and include reflected signals 118 off of objects in the environment 102 as well as coupled radar signals 116.

At 714, the monitoring device 106 may determine, based on the third radar signal, movement data associated with the physical object that is moving in the environment 102 of the monitoring device 102. For instance, the monitoring device 106 may determine whether the physical object is moving, a direction of the movement, a velocity at which the object is moving, etc.

FIG. 8 illustrates a flow diagram of an example process 800 for calibrating at least one of a radar transmitter and/or radar receiver to remove undesirable effects of mutual coupling.

At 802, a computing device (e.g., monitoring device 106) may emit a first radar signal into an environment of the computing device using a radar transmitter of the computing device where the radar transmitter emitting the first radar signal according to a first gain. For instance, the radar transmitter 110 of the monitoring device 106 may emit one or more emitted radar signals 114 according to a stepped frequency continuous wave (SFCW) protocol that operates anywhere in the range from about 5 megahertz (MHz) to about 130 gigahertz (GHz), and may operate in steps at various frequency steps (e.g., 10 MHz, 25 MHz, 100 MHz, etc.).

At 804, the computing device of may generate first data representing a portion of the first radar signal received by a radar receiver the computing device due to mutual coupling between the radar transmitter and the radar receiver. For instance, the radar transmitter 110 and the radar receiver 112 may be in close enough proximity in the device 106 such that coupled radar signals 116 (undesired) are received by the radar receiver 112 due to mutual coupling and before the emitted radar signals 114 are able to reflect off objects in the environment 102 and exterior the monitoring device 106.

At 806, the computing device may determine, using the first data, coupling data that indicates a measure of the mutual coupling. For instance, because the transmit power/energy is known for the first radar signal, and the energy in the received portion of the first radar signal will be dominated by coupled signals, the monitoring device 106 may determine coupling coefficients 144 that indicate measurements of mutual coupling between radar transmitter 110 and the radar receiver 112, such as by simply dividing the transmit energy/power of the transmitted first radar signals by the receive energy/power of the received portion of the first radar signals.

At 808, the computing device may adjust, based at least in part on the coupling data, the first gain of the radar transmitter and/or the radar transmitter to a second gain. For instance, the monitoring device 106 may update gain tables and/or gain values 148, for the radar transmitter 110 and/or radar receiver 112. The updated gain may help ensure that the coupled radar signals 116 do not interfere with the event component's 140 ability to accurately detect movement in the environment 102. At 810, emitting a second radar signal into the environment using the radar transmitter according to the second gain. After adjusting the gain, the monitoring device 106 may begin using the radar system 126 at the adjusted gain values 148 to monitor movement in the environment 102.

Figure 9:
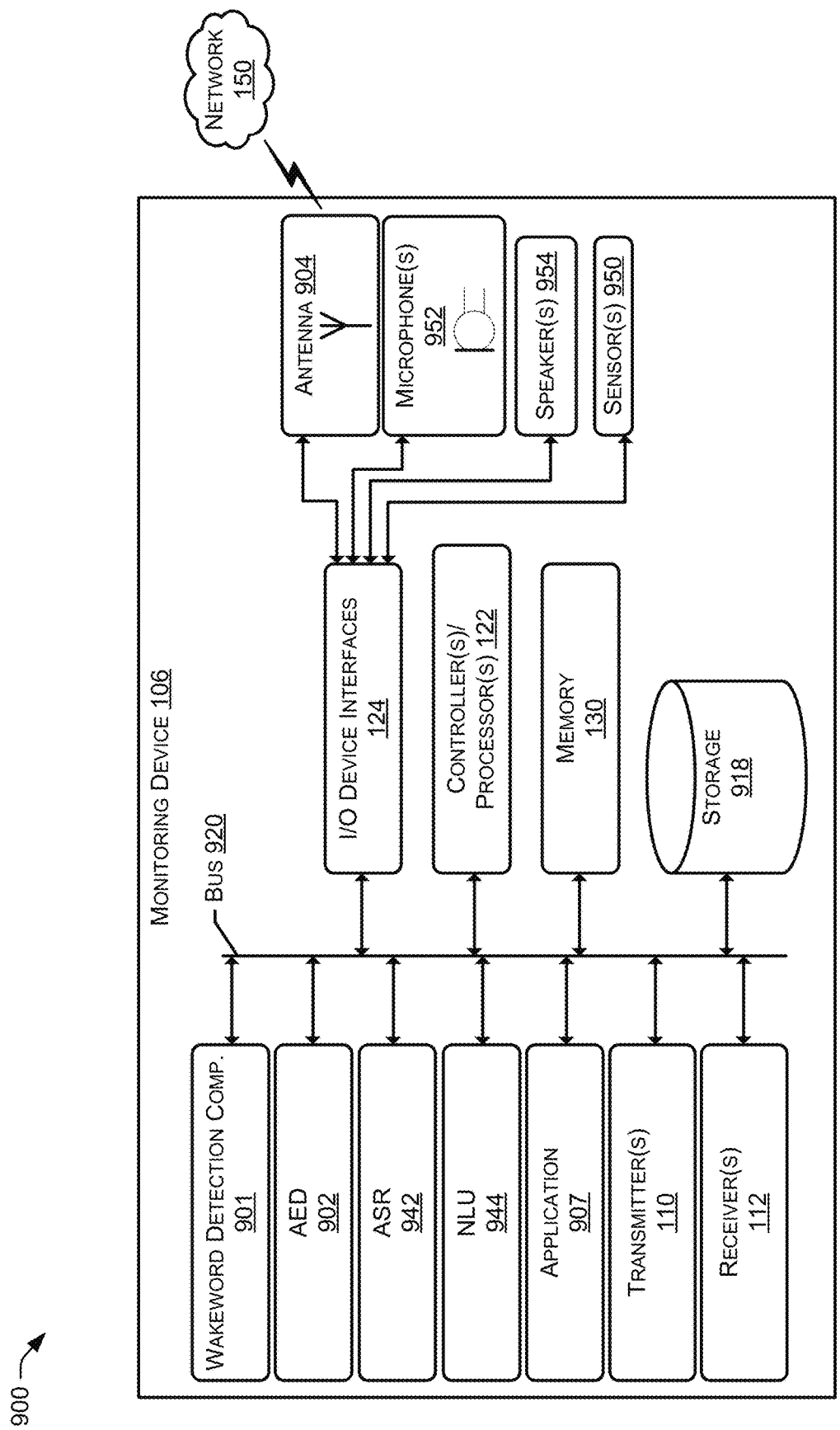
FIG. 9 illustrates a conceptual diagram of example components of a monitoring device that may be calibrated to detect events in an environment using radar while removing direct coupling using calibration techniques.

FIG. 9 illustrates a conceptual diagram of example components of a monitoring device that may be calibrated to detect events in an environment using radar while removing direct coupling using calibration techniques. The device 106 may be implemented as a standalone device 106 that is relatively simple in terms of functional capabilities with limited input/output components, memory, and processing capabilities. For instance, the device 106 may not have a keyboard, keypad, or other form of mechanical input. The device 106 may also lack a display (other than simple lights, for instance) and a touch screen to facilitate visual presentation and user touch input. Instead, the device 106 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 106. Nonetheless, the primary, and potentially only mode, of user interaction with the device 106 is through voice input and audible output. In some instances, the device 106 may simply comprise a microphone 952, a power source, and functionality for sending generated audio data via one or more antennas 904 to another device.

The device 106 may also be implemented as a more sophisticated computing device, such as a computing device similar to, or the same as, a smart phone or personal digital assistant. The device 106 may include a display with a touch interface and various buttons for providing input as well as additional functionality such as the ability to send and receive communications. Alternative implementations of the device 106 may also include configurations as a personal computer. The personal computer may include a keyboard, a mouse, a display, and other hardware or functionality that is found on a desktop, notebook, netbook, or other personal computing devices. In examples, the device 106 may include an automobile, such as a car. In other examples, the device 106 may include a pin on a user's clothes or a phone on a user's person. In examples, the device 106 and may not include speaker(s) and may utilize speaker(s) of an external or peripheral device to output audio via the speaker(s) of the external/peripheral device. In this example, the device 106 might represent a set-top box (STB), and the device 106 may utilize speaker(s) of another device such as a television that is connected to the STB for output of audio via the external speakers. In other examples, the device 106 may not include the microphone(s) 952, and instead, the device 106 can utilize microphone(s) of an external or peripheral device to capture audio and/or generate audio data. In this example, the device 106 may utilize microphone(s) of a headset that is coupled (wired or wirelessly) to the device 106. These types of devices are provided by way of example and are not intended to be limiting, as the techniques described in this disclosure may be used in essentially any device that has an ability to recognize speech input or other types of natural language input.

The device 106 of FIG. 9 may include one or more controllers/processors 122, that may include a central processing unit (CPU) for processing data and computer-readable instructions, and memory 130 for storing data and instructions of the device 106. The device 106 may also be connected to removable or external non-volatile memory and/or storage 918, such as a removable memory card, memory key drive, networked storage, etc., through input/output device interfaces 124.

Computer instructions for operating the device 106 and its various components may be executed by the device's controller(s)/processor(s) 122, using the memory 130 as temporary "working" storage at runtime. A device's computer instructions may be stored in a non-transitory manner in non-volatile memory 130, storage 918, or an external device (s). Alternatively, some or all of the executable instructions may be embedded in hardware or firmware on the device 106 in addition to or instead of software.

The device 106 may include input/output device interfaces 124. A variety of components may be connected through the input/output device interfaces 124. Additionally, the device 106 may include an address/data bus 920 for conveying data among components of the respective device. Each component within a device 106 may also be directly connected to other components in addition to, or instead of, being connected to other components across the bus 920.

The device 106 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display, or the device 106 may be "headless" and may primarily rely on spoken commands for input. As a way of indicating to a user that a connection between another device has been opened, the device 106 may be configured with one or more visual indicators, such as the light elements(s), which may be in the form of LED(s) or similar components (not illustrated), that may change color, flash, or otherwise provide visible light output, such as for a notification indicator on the device 106. The input/output device interfaces 112 that connect to a variety of components. This wired or a wireless audio and/or video port may allow for input/output of audio/video to/from the device 106. The device 106 may also include an audio capture component. The audio capture component may be, for example, a microphone 952 or array of microphones, a wired headset or a wireless headset, etc. The microphone 952 may be configured to capture audio. If an array of microphones is included, approximate distance to a sound's point of origin may be determined using acoustic localization based on time and amplitude differences between sounds captured by different microphones of the array. The device 106 (using microphone 952, wakeword detection component 901, ASR component 942, etc.) may be configured to generate audio data corresponding to captured audio. The device 106 (using input/output device interfaces 124, antenna 904 etc.) may also be configured to transmit the audio data to the remote system 152 for further processing or to process the data using internal components, such as a wakeword detection component 901.

Via the antenna(s) 904, the input/output device interface 124 may connect to one or more networks 150 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 106 via wired connection to an external alternating current (AC) outlet, and/or via onboard power sources, such as batteries, solar panels, etc.

Through the network(s) 106, the speech-processing system may be distributed across a networked environment. Accordingly, the device 106 and/or the remote system 152 may include an ASR component 942. The ASR component 942 of device 106 may be of limited or extended capabilities. The ASR component 942 may include language models stored in ASR model storage component, and an ASR component 942 that performs automatic speech recognition. If limited speech recognition is included, the ASR component 942 may be configured to identify a limited number of words, such as keywords detected by the device, whereas extended speech recognition may be configured to recognize a much larger range of words.

The device 106 and/or the remote system 152 may include a limited or extended NLU component 944. The NLU component 1044 of device 106 may be of limited or extended capabilities. The NLU component 944 may comprise a name entity recognition module, an intent classification module and/or other components. The NLU component 944 may also include a stored knowledge base and/or entity library, or those storages may be separately located.

In examples, AED 902 may also be performed by the device 106. In these examples, the operations may include causing the AED component 902 to be enabled or otherwise turned on, or the operations may include causing the AED component 902 to transition from a first mode to a second mode representing a higher sensitivity to audio data generated by the microphone 952. The AED component 902 may utilize the audio data generated by the microphone 952 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 902 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint.

The device 106 and/or the remote system 152 may also include an application 907 that is configured to execute commands/functions associated with a spoken command as described herein. The device 106 may include a wake word engine, which may be a separate component or may be included in an ASR component 942. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 106 may be configured collectively to identify a set of the directional audio signals in which the wake expression is detected or in which the wake expression is likely to have occurred. In examples, the device 106 and may not include speaker(s) 954 and may utilize speaker(s) of an external or peripheral device to output audio via the speaker(s) of the external/peripheral device.

The antennas 904 may be configured to send and receive electromagnetic waves in radio and/or microwave domains. At least one of the antennas may be configured to send and receive electromagnetic waves having a bandwidth in the ultra-wide band range, such as a bandwidth at or around 6 GHz. At least one other of the antennas may be configured to send and receive electromagnetic waves having a bandwidth in the millimeter wave range, such as a bandwidth at or around 60 GHz. It should be understood that while the examples used herein describe one antenna associated with the ultra-wide band range and one antenna associated with the millimeter band range, each or either of these antennas may include multiple antennas and/or antenna arrays. The antennas may transmit the electromagnetic waves into the environment in which the device 106 is located and may receive the electromagnetic waves back at the device 106. The distortion and/or change in the electromagnetic waves as received by the device 106 may indicate motion and/or a change in position of one or more objects within the environment. The changes in motion that may be detected may include, for example, entry and/or exit of a user from the environment, location of the user relative to the device 106, number of users in the environment, an angle at which a user is positioned relative to the device 106, a posture of a user, movement of a user within the environment, a direction of travel of a user, a size of a user, etc.

The electromagnetic waves may be received by the antennas. The corresponding sensor data may be sent to the event component, which may determine whether one or more predefined events has occurred based at least in part on the sensor data. For example, one or more models may be configured to receive the sensor data as input and determine if one or more characteristics associated with the audio data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. In these examples, the event component may analyze the sensor data with respect to reference data indicated to correspond to these and/or other events. When the event component determines that the sensor data corresponds to the reference sensor data, such as above a threshold confidence, the event component may identify, determine, and/or generate event data indicating that the predefined event has occurred. The event data may be sent from the device 106 to the remote system 152 for processing.

To assist with the detection of acoustic events, for example, the device 106 may include one or more sensors 950 that may be configured to detect environmental changes. The sensors 950 may include, for example, radar, audio sensors such as the microphones 952, ultrasonic sensors, cameras, temperature sensors, motion sensors, light sensors, etc. The monitoring device 106 may also include an ultrasonic component. The ultrasonic component may include functionality that allows for sound waves in the ultrasonic frequency to be emitted and received for the detection of predefined events and/or the detection of subjects in an environment.

Additionally, the monitoring device 106 may include the radar transmitter array 110. The radar transmitter array 110 may be configured to produce and emit electromagnetic waves in the radio or microwave domain. One or more transmitting antennas of the monitoring device 106 may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. Additionally, the monitoring device 106 may include the radar receiver array 112, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the monitoring device 106 may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
    emitting, by a computing device using a radar transmitter, a first radar signal into an environment of the computing device, the radar transmitter having an associated first gain;
    generating first data representing a portion of the first radar signal received by a radar receiver of the computing device due to mutual coupling between the radar transmitter and the radar receiver;
    determining, using the first data, coupling data that indicates a measure of the mutual coupling;
    determining, using the first data, a first value that indicates an amount of energy associated with the portion of the first radar signal;
    adjusting, based at least in part on the coupling data, the first gain of the radar transmitter to a second gain;
    emitting a second radar signal having the second gain into the environment;
    generating second data representing a reflection of the second radar signal off an object in the environment;
    determining a second value that indicates an amount of energy associated with the second data;
    determining that the second value is less than or equal to the first value; and
    increasing the second gain of the radar transmitter to a third gain.

2. The method of claim 1, wherein
    determining the second value includes determining a signal-to-noise ratio (SNR) value associated with the second data; and
    determining that the second value is less than or equal to the first value includes determining that the SNR value is less than or equal to the first value.

3. The method of claim 1, further comprising:
    emitting, by the radar transmitter, a plurality of first radar signals during a first time frame; and
    emitting, by the radar transmitter, a plurality of second radar signals during a second time frame,
    wherein the first gain of the radar transmitter is adjusted to the second gain after the first time frame and before the second time frame.

4. The method of claim 1, wherein determining the coupling data includes:
    determining, at least partly using the first data, a first energy value corresponding to the portion of the first radar signal; and
    comparing the first energy value with reference to a second energy value associated with the radar transmitter emitting the first radar signal.

5. The method of claim 1, further comprising:
    determining, using the second data, movement data associated with the object.

6. The method of claim 1, wherein determining the coupling data includes:
    determining, at least partly using the first data, a first phase value corresponding to a first phase of the portion of the first radar signal; and
    comparing the first phase value with reference to a second phase value corresponding to a second phase of the first radar signal as emitted by the radar transmitter.

7. The method of claim 1, further comprising adjusting, based at least in part on the coupling data, a third gain of the radar receiver to a fourth gain.

8. A system, comprising:
a radar transmitter;
a radar receiver;
one or more processors; and
one or more computer-readable media storing computer-executable instructions that, when executed by the one or more processors, cause the one or more processors to perform operations comprising:
emitting a first radar signal into an environment using the radar transmitter;
generating first data representing a portion of the first radar signal received by the radar receiver due to mutual coupling between the radar transmitter and the radar receiver, the radar receiver having a first gain;
determining, using the first data, coupling data that indicates a measure of the mutual coupling;
adjusting, based at least in part on the coupling data, the first gain of the radar receiver to a second gain;
emitting a second radar signal into the environment using the radar transmitter;
determining, using the first data, a first value that indicates an amount of energy associated with the portion of the first radar signal;
generating second data representing a reflection of the second radar signal off an object in the environment;
determining a second value that indicates an amount of energy associated with the second data;
determining that the second value is less than or equal to the first value; and
adjusting the second gain of the radar receiving to a third gain.

9. The system of claim 8, wherein determining the coupling data includes:
determining, at least partly using the first data, a first phase value corresponding to a first phase of the portion of the first radar signal; and
comparing the first phase value with reference to a second phase value corresponding to a second phase of the first radar signal as emitted by the radar transmitter.

10. The system of claim 8, wherein determining the coupling data includes:
determining, at least partly using the first data, a first energy value corresponding to the portion of the first radar signal; and
comparing the first energy value with reference to a second energy value associated with the radar transmitter emitting the first radar signal.

11. The system of claim 8, the operations further comprising:
emitting, by the radar transmitter, a plurality of first radar signals during a first time frame; and
emitting, by the radar transmitter, a plurality of second radar signals during a second time frame,
wherein the first gain of the radar receiver is adjusted to the second gain between the first time frame and the second time frame.

12. The system of claim 8, the operations further comprising:
determining, using the second data, movement data associated with the object.

13. The system of claim 12, wherein:
determining the second value includes determining a signal-to-noise ratio (SNR) value associated with the second data; and
determining that the second value is less than or equal to the first value includes determining that the SNR value is less than or equal to the first value.

14. The system of claim 8, the operations further comprising adjusting, based at least in part on the coupling data, a third gain of the radar transmitter to a fourth gain.

15. A computing device, comprising:
a radar transmitter;
a radar receiver;
one or more processors; and
one or more computer-readable media storing computer-executable instructions that, when executed by the one or more processors, cause the one or more processors to perform operations comprising:
emitting a first radar signal into an environment using the radar transmitter;
generating first data representing a first portion of the first radar signal received by the radar receiver due to mutual coupling between the radar transmitter and the radar receiver and a second portion representing a reflection of the first radar signal off an object in the environment, the radar receiver having a first gain;
determining, using the first data, a first value that indicates an amount of energy associated with the first portion of the first radar signal;
determining, using the first data, a second value that indicates an amount of energy associated with the second portion of the first radar signal;
adjusting, based at least in part on the first value and the second value, the first gain of the radar receiver to a second gain; and
emitting a second radar signal into the environment using the radar transmitter.

16. The computing device of claim 15, the operations further comprising:
determining, at least partly using the first data, a first energy value corresponding to the portion of the first radar signal; and
determining coupling data by comparing the first energy value with reference to a second energy value associated with the radar transmitter emitting the first radar signal.

17. The computing device of claim 15, the operations further comprising:
emitting, by the radar transmitter, a plurality of first radar signals during a first time frame; and
emitting, by the radar transmitter, a plurality of second radar signals during a second time frame,
wherein the first gain of the radar receiver is adjusted to the second gain between the first time frame and the second time frame.

18. The computing device of claim 15, wherein:
determining the second value includes determining a signal-to-noise ratio (SNR) value associated with the first data;
the operations further comprising determining that the second value is less than or equal to the first value includes determining that the SNR value is less than or equal to the first value.

* * * * *